(12) United States Patent
Mahant Shetti

(10) Patent No.: US 9,966,792 B2
(45) Date of Patent: May 8, 2018

(54) UNINTERRUPTIBLE POWER SUPPLY FOR SMPS LOADS

(71) Applicant: Shivaling Shrishail Mahant Shetti, Belgaum (IN)

(72) Inventor: Shivaling Shrishail Mahant Shetti, Belgaum (IN)

(*) Notice: Subject to any disclaimer, the term of this patent is extended or adjusted under 35 U.S.C. 154(b) by 291 days.

(21) Appl. No.: 14/945,793

(22) Filed: Nov. 19, 2015

(65) Prior Publication Data

US 2016/0141917 A1    May 19, 2016

(30) Foreign Application Priority Data

Nov. 19, 2014  (IN) .......................... 5819/CHE/2014

(51) Int. Cl.
*H02J 1/10* (2006.01)
*H02J 9/06* (2006.01)
*H02M 1/10* (2006.01)
*H02M 7/06* (2006.01)

(52) U.S. Cl.
CPC ............... *H02J 9/061* (2013.01); *H02M 1/10* (2013.01); *H02M 7/066* (2013.01)

(58) Field of Classification Search
CPC .......... H02J 9/061; H02M 1/10; H02M 7/066
USPC .......................................................... 307/23
See application file for complete search history.

(56) References Cited

U.S. PATENT DOCUMENTS

| 5,172,009 A | * | 12/1992 | Mohan | .................... H02J 9/062 307/105 |
| 2011/0062777 A1 | * | 3/2011 | Sotnikow | .............. H02J 7/1423 307/9.1 |
| 2013/0246815 A1 | * | 9/2013 | Uehara | ................... H02J 9/061 713/300 |

* cited by examiner

*Primary Examiner* — Alfonso Perez Borroto
(74) *Attorney, Agent, or Firm* — The Law Office of Austin Bonderer, PC; Austin Bonderer

(57) ABSTRACT

An uninterruptible power supply circuit is provided. The uninterruptible power supply circuit includes a first diode, a second diode, a bridge rectifier, and one or more electrical loads. The first diode, the second diode, the bridge rectifier, and the one or more electrical loads are electrically connected in the uninterruptible power supply circuit to drive the one or more electrical loads with a DC voltage or the intended AC supply voltage when the AC supply voltage is cutoff.

7 Claims, 5 Drawing Sheets

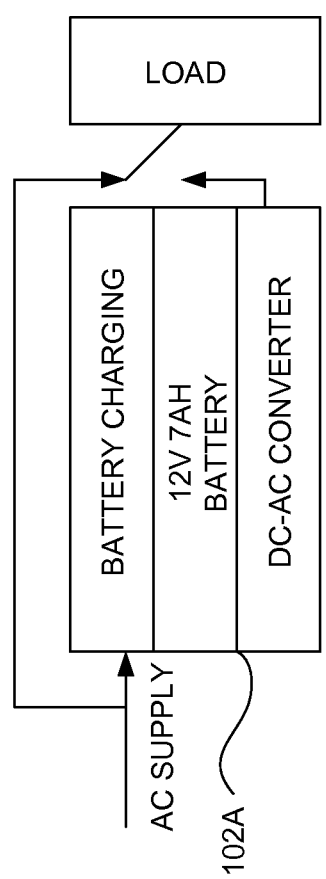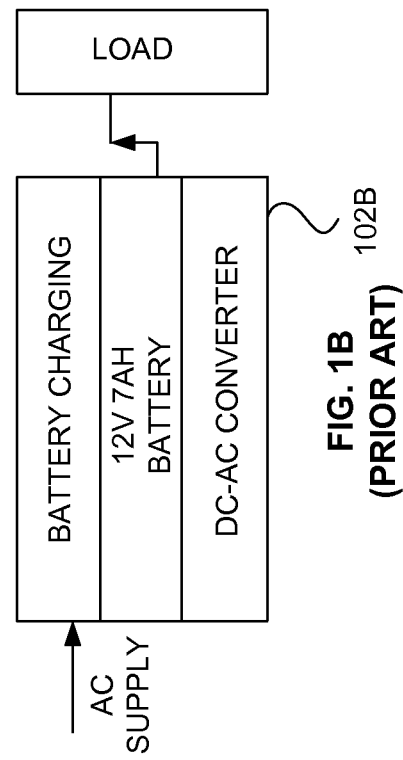
FIG. 1A (PRIOR ART)
FIG. 1B (PRIOR ART)

UNINTERRUPTIBLE POWER SUPPLY FOR SMPS LOADS

BACKGROUND

Technical Field

The embodiments herein generally relate to an uninterrupted power supply (UPS) device, and, more particularly, to drive a load containing a switched mode power supply circuit amid increasing use of the switched mode power supply based loads.

Description of the Related Art

Nowadays, deficit of the power supply is common in India. The scarcity of the power supply is high in rural areas when compared to the urban areas. Also the power distribution to the rural areas is less compared to the urban areas. Due to short time disruptions and scheduled disruptions of the power supply, most of the companies and technology based computer services related industries shy away from rural areas. This problem is not only for the companies and the industries but also for the common people who are all living in rural areas. An uninterrupted power supply (UPS) technology was invented for reducing the power disruption problem.

In the prior art, the uninterrupted power supply converts AC power supply to DC then save the DC power in a battery that is connected with the UPS when the main supply is ON. The uninterrupted power supply then reverses the process of converting the power when the main supply is OFF. The circuit uses a relay and hence momentary glitches can occur and these are detrimental to operation of electronic circuits such as modems which rely on a continuous signal and may take considerable time to resynchronize. FIGS. 1A-1B show typical types of UPS connected to loads. The FIG. 1A is an OFF line UPS 102A, where the loads are switched from AC to AC supply generated from a battery using an inverter. The OFF Line uninterruptible power supply 102A includes a battery charging unit, a 12 v 7 Ah battery, DC-AC Converter, and a load. This Off Line uninterruptible power supply 102A is connected to lights and when the electricity goes away, the lights are shut off. The battery is charged when the AC power is turned on and as soon as the AC power is switched off, then the battery starts generating a voltage up till 230V. The load is then turned on to the 230V that is generated by the battery. The load is then turned off for some time and then turned back on again. This is for a very small duration and the switchover time could be even micro seconds. The load switched from DC to AC supply generated from the battery by making use of an inverter. The main drawback of an OFF Line uninterruptible power supply is that there is a glitch which is produced at the output.

The FIG. 1B is an ON line UPS 102B, where the AC charges the battery. The ON Line uninterruptible power supply 102B includes a battery charging unit, a 12 v 7 Ah battery, DC-AC Converter, and a load. This uninterruptible power supply is more expensive when compared to the OFF Line uninterruptible power supply 102A. The basic working followed here is that the main AC input that is given charges the battery. The battery produces up till 230V and the circuit producing this 230V is always on. There is also a hand held unit which produces that power up to 2 to 3 CFL's, small loads. The AC voltage produces charging of the battery and when the AC goes off, the oscillator helps to generate 50 Hz 230V. There are no glitches at the output, hence the design runs smoothly. The main disadvantages of an ON Line uninterruptible power supply 102B is that the overall efficiency is less because the inverter always remains on and never turns off. Also, the power consumed by the charging unit is very high because it has to supply power to the inverter and also supply power for charging the battery simultaneously. The loads are always connected to the AC supply generated from the battery using the inverter. Here modems run correctly since no glitches occur in the output. The ON line UPS 102B is an AC generator that is always ON to generate the AC supply voltage to the electrical loads.

Typical UPS are used to limit power disruption, the usage of power supply from the UPS to the loads, more expensive, and low efficiency. Hence, overall usage of the power is high, but the supply is scarce. Accordingly, there remains a need for an uninterrupted power specifically to efficiently collect charge when line is working and supply that to loads when required. The emergency lighting units are primarily maximizing useful life for use on full charge and not necessarily for most economical transfer of energy.

SUMMARY

In view of a foregoing, an embodiment herein provides an uninterruptible power supply circuit. The uninterruptable power supply circuit includes a first diode, a second diode, a bridge rectifier, and one or more electrical loads. The first diode that includes a positive terminal and a negative terminal. The positive terminal of the first diode is connected to an AC input supply voltage. The second diode that includes a positive terminal and a negative terminal. The positive terminal of the second diode is connected to a positive terminal of a battery source, and the negative terminal of the second diode is connected to the negative terminal of the first diode. The bridge rectifier that includes a first pair of diodes and a second pair diodes. A negative terminal of the first diode of first pair of diodes is connected to a positive terminal of the second diode of the first pair of diodes. The negative terminal of the second diode of the second pair of diodes is connected to a positive terminal of the first diode of the second pair of diodes, a negative terminal of the battery source, and a ground terminal. The negative terminals of said first diode, and said second diode are connected to said positive terminal of the second diode of the first pair of diodes and the negative terminal of the first diode of the first pair of diodes. The one or more electrical loads are connected to the negative terminals of the second diode of the first pair of diodes and the first diode of the second pair of diodes, and the positive terminals of the first diode of the first pair of diodes and the second diode of the second pair of diodes respectively to drive the one or more electrical loads with a DC voltage or the intended AC supply voltage when the AC supply voltage is cutoff.

In one embodiment, the uninterruptable power supply circuit includes a 200 W AC bulb acting like a current limiting resistor that is connected between said negative terminal of the first diode and the positive terminal of the second diode to charge the battery connected with the uninterrupted power supply device when the battery voltage is lower than the AC input supply voltage.

In one aspect, an uninterrupted power supply circuit is provided. The uninterruptable power supply circuit includes a first diode, a second diode, a 200 W ac bulb, a bridge rectifier, and one or more electrical loads. The first diode that includes a positive terminal and a negative terminal. The positive terminal of the first diode is connected to an AC input supply voltage. The second diode that includes a positive terminal and a negative terminal. The positive terminal of the second diode is connected to a positive terminal of a battery source, and the negative terminal of the second diode is connected to the negative terminal of the first diode. The 200 W AC bulb is connected between the positive terminal of the second diode and the negative terminal of the first diode to charge the battery that is connected with the uninterrupted power supply circuit when the battery voltage is lower than the AC input supply voltage. The bridge rectifier that includes a first pair of diodes and a second pair diodes. A negative terminal of the first diode of the first pair of diodes is connected to a positive terminal of the second diode of the first pair of diodes. The negative terminal of the second diode of the second pair of diodes is connected to a positive terminal of the first diode of the second pair of diodes, a negative terminal of said battery source, and a ground terminal. The negative terminals of the first diode, and said second diode are connected to the positive terminal of the second diode of the first pair of diodes and the negative terminal of the first diode of the first pair of diodes. A load uses a DC that is produced by the bridge rectifier. The one or more electrical loads are connected to the negative terminals of the second diode of the first pair of diodes and the first diode of the second pair of diodes, and the positive terminals of the diode of the first pair of diodes and the second diode of the second pair of diodes respectively to drive the one or more electrical loads with a DC voltage or the intended AC supply voltage when said AC supply voltage is cutoff.

In one embodiment, the one or more electrical loads are functioned when the AC input supply voltage and an output DC voltage difference are low.

In another embodiment, the 200 W AC bulb is connected between the negative terminal of the first diode and the positive terminal of the second diode as a charging circuit that is added to the switched mode power supply circuit.

In yet another embodiment, the one or more electrical loads of the uninterrupted power supply circuit are handled high voltage input range (110V-220V) using the switched mode power supply circuit.

In another aspect, an uninterrupted power supply circuit is provided. The uninterrupted power supply circuit includes a first diode, a second diode, a first bridge rectifier, a second bridge rectifier being part of the load, a first capacitor, a second capacitor being part of the load, and a 120V battery. The first diode that includes a positive terminal and a negative terminal. The positive terminal of the first diode is connected to an AC input supply voltage. The second diode that includes a positive terminal and a negative terminal. The negative terminal of the second diode is connected to the negative terminal of first diode. The first bridge rectifier that includes a first pair of diodes, and a second pair of diodes. Negative terminals of the first pair of diodes are connected to one another. The positive terminal of the second diode of the first pair of diodes and the negative terminal of the second diode of the second pair of diodes are connected to a ground terminal. The second bridge rectifier being part of the load that includes a third pair of diodes, and a fourth pair of diodes. The negative terminals of the third pair of diodes are connected one another and also connected to the positive terminal of the second diode. The positive terminals of the fourth pair of diodes are connected to one another. The first capacitor that includes a positive terminal and a negative terminal. The positive terminal of the first capacitor is connected to the AC input supply voltage, and the negative terminal of said capacitor is connected to the positive terminal of the first diode of the third pair of diodes and the negative terminal of the first diode of the fourth pair of diodes. The second capacitor that includes a positive terminal and a negative terminal. The positive terminal of the second capacitor is connected to the negative terminals of the first pair of diodes and said negative terminal of the second capacitor is connected to the positive terminals of said second pair of diodes. The 120V battery that includes a positive terminal and a negative terminal. The positive terminal of the 120 V battery is connected to said positive terminal of said second diode and a negative terminal of the 120V battery is connected to the positive terminal of the second diode of the first pair of diodes and the negative terminal of the second diode of the second pair of diodes to work on dampening the voltage change by eliminating the peaks to maintain the constant voltage level.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is an OFF Line uninterruptible power supply connected to loads;

FIG. 1B is an ON Line uninterruptible power supply connected to the loads;

DETAILED DESCRIPTION OF PREFERRED EMBODIMENTS

Figure 2A:
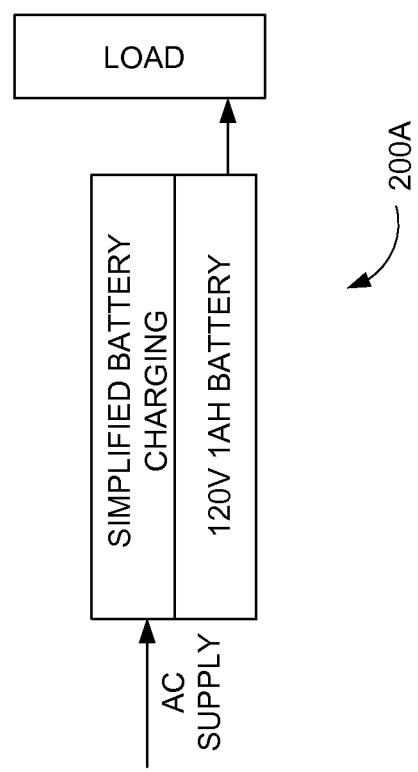
FIG. 2A is a Pico Grid uninterruptible power supply according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an uninterrupted power supply that is recognized based on loads. The embodiments herein achieve this by providing uninterrupted power to a load with a switched mode power supply. Further, a battery voltage is increased without affecting the switched mode power supply circuit operation by placing the electric loads (e.g., 200 W AC bulb) in the switched mode power supply circuit. The switched mode power supply circuit with the 200 W AC bulb that charges the battery when AC voltage is higher than the battery voltage. Referring now to the drawings, and more particularly to FIGS. 2A through 4, where similar reference characters denote corresponding features consistently throughout the figures, there are shown preferred embodiments.

FIG. 2A is a Pico Grid uninterruptible power supply 200A according to an embodiment herein. The Pico Grid uninterruptible power supply 102C consists of a simplified battery charging unit, a 120 v 7 Ah battery, and a load. The Pico Grid uninterruptible power supply 102C provides power to modern loads using a SMBS where the first stage internally converts AC to DC. The 120V is sufficient to run the switched mode power supply based devices. The 120V battery then directly drives most of the loads (e.g. a CFL modem, a computer, a cell phone charger, etc.). Elimination of an inverter converting Dc to AC reduces cost, and at least 30% more efficient. Use of higher battery voltage allows for higher efficiency during charging. Therefore using the device to charge the device at one time and using the energy at another time is much more economical. There are no glitches so modems can run efficiently with no delays as well.

Figure 2B:
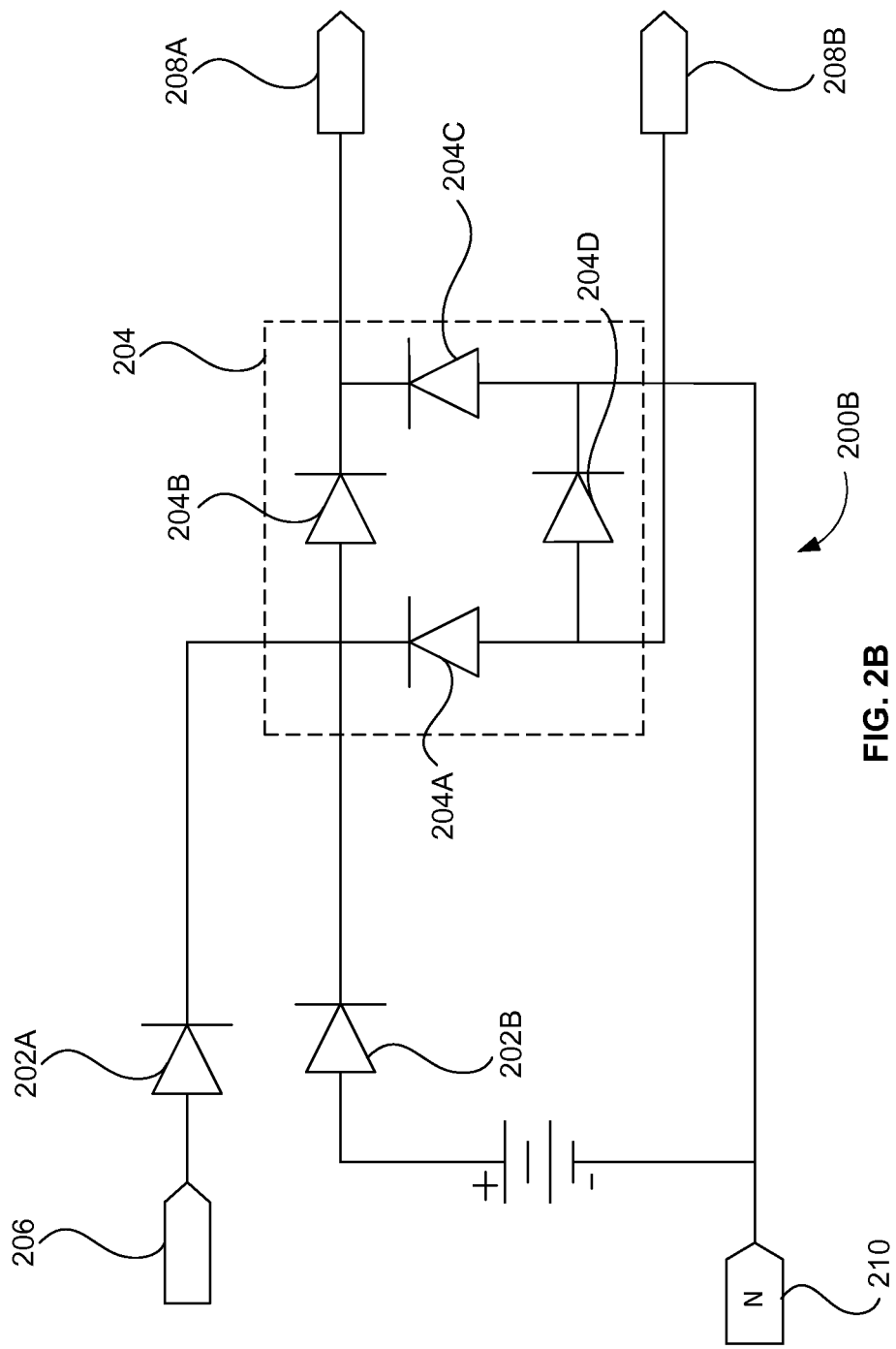
FIG. 2B is a uninterruptible power supply circuit diagram that illustrates recognition of loads based on a switched mode power supply according to an embodiment herein.

FIG. 2B is a circuit diagram 200B that illustrates recognition of loads based on the switched mode power supply according to an embodiment herein. The switched mode power supply circuit 200B includes a first diode 202A, a second diode 202B, a first bridge rectifier 204, an AC input supply voltage 206, one or more electrical loads 208A-B. The first bridge rectifier 204 includes a first pair of diodes 204A-B and a second pair of diodes 204C-D. The first diode 202A, the second diode 202B, the first bridge rectifier 204, and one or more electrical loads 208 A-B are connected together in the switched mode power supply circuit 200B. The first diode 202A that includes a positive terminal and a negative terminal. The positive terminal of the first diode 202A is connected to an AC input supply voltage 206. The second diode 202B that includes a positive terminal and a negative terminal. The positive terminal of the second diode 202B is connected to a positive terminal of a battery source. The negative terminal of the second diode 202B is connected to the negative terminal of the first diode 202A. The negative terminal of said diode 204A is connected to a positive terminal of the diode 204B. The negative terminal of the diode 204D is connected to a positive terminal of the diode 204C, a negative terminal of the battery source, and a ground terminal 210. The negative terminals of the first diode 202A, and the second diode 202B are connected to the positive terminal of the diode 204B and the negative terminal of the diode 204A. The one or more electrical loads 208A-B are connected to the negative terminals of the diode 204B and the diode 204C, and the positive terminals of the diode 204A and the diode 204D respectively to drive the one or more electrical loads 208A-B with a DC voltage or the intended AC supply voltage 206 when the AC supply voltage 206 is cutoff. The load of the UPS has a capability of handling high voltage input range (i.e. 110V-220V). The purpose of using the bridge rectifier 204 is for conversion of AC power to DC power.

For example, when 220V AC input supply voltage 106 is applied to the switched mode power supply circuit 200B, a DC voltage difference between the one or more electrical loads 208A-B is 325 volts approximately. But in rural areas when the AC input supply voltage 206 is dropped to 140 volts, the DC voltage difference between the one or more electrical loads 208A-B is 200 volts approximately. Even if the DC voltage difference is dropped to 120 volts, the one or more electrical loads 208A-B function using the switched mode power supply circuit 200B. In one embodiment, the output using the switched mode power supply circuit 200B may be applicable to the one or more electrical loads 208A-B that is selected from a group comprising (a) a CFL device, (b) a personal computer, (c) a modem, (d) a router, and/or (e) a tube light, etc. In another embodiment, the switched mode power supply circuit is applicable in the UPS by small weight due to absence of a heavy transformer in the UPS.

Figure 3:
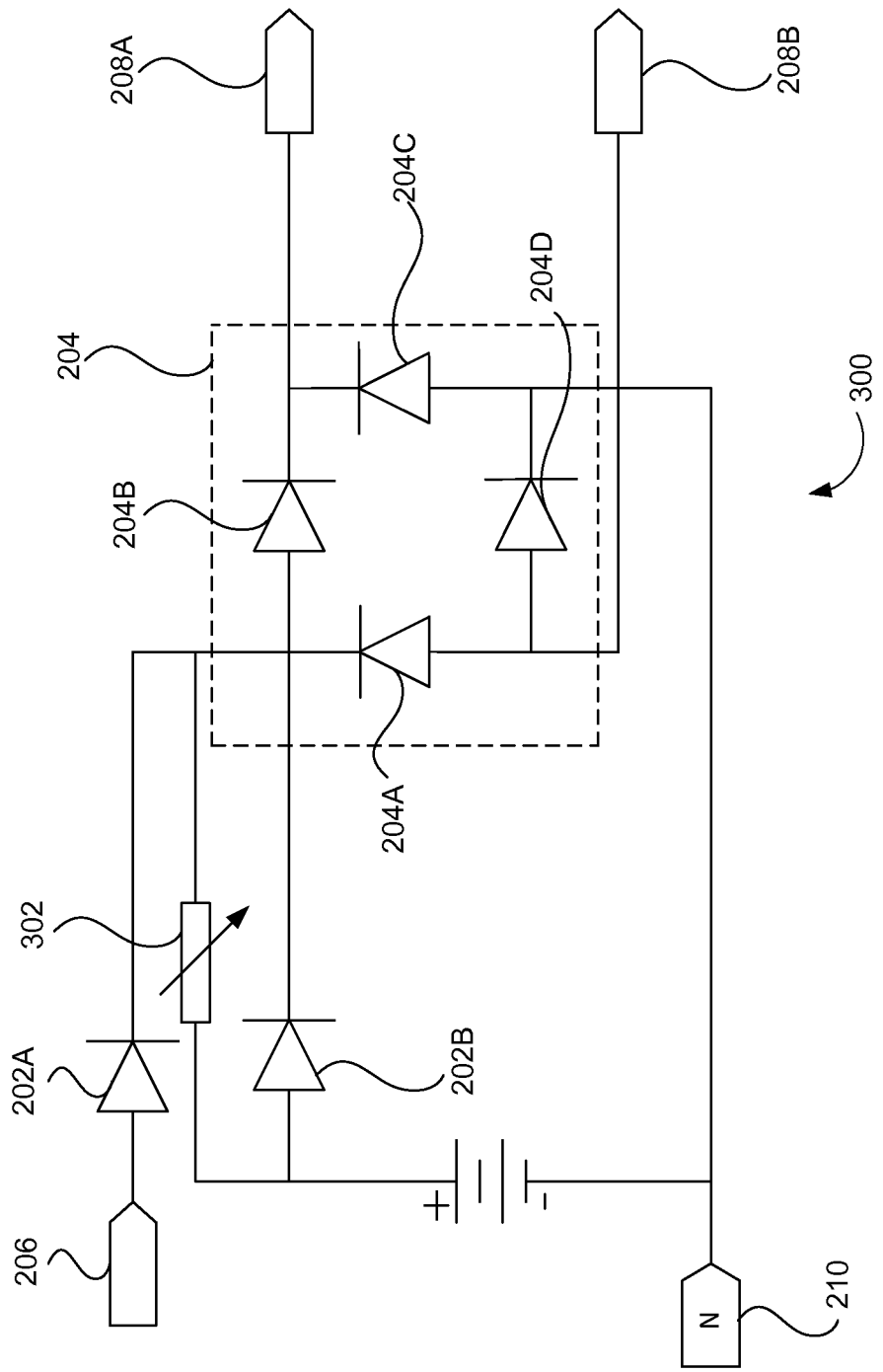
FIG. 3 is a circuit diagram that illustrates the uninterruptible power supply circuit with a 200 W AC bulb to increase a battery voltage without affecting the circuit operation of FIG. 1 according to an embodiment herein.

FIG. 3 is a circuit diagram 300 that illustrates the switched mode power supply circuit 200B with a 200 W AC bulb 302 to increase a battery voltage without affecting the circuit operation of FIG. 1 according to an embodiment herein. The switched mode power supply circuit 200B includes an electric load (e.g., 200 W AC bulb) 302. The 200 W AC bulb 302 is connected to the negative terminal of the first diode 202A and the positive terminal of the second diode 202B to charge the battery when the battery voltage is lower than the AC input supply voltage 206. Hence, the battery voltage can be increased without affecting the switched mode power supply circuit 200B. The 200 W AC bulb 302 is act as a charging circuit that is added to the switched mode power supply circuit 200B. In one embodiment, a need of PCB (printed circuit board) is eliminated by placing the first diode 202A and the second diode 202B in the 200 W AC bulb 302 holder. However, a tube light with a non-electric choke, a fan, and the devices that containing AC motors such as cooling devices/appliances, but not limited to refrigerator may not be applicable for using the switched mode power supply circuit 200B.

The switched mode power supply circuit 200B in the uninterrupted power supply can be used to recognize of the loads (e.g., the electronic appliances) with switched mode power supply circuit 200B. The first bridge rectifier 204 in the switched mode power supply circuit 200B is used to drive the load devices with DC voltage as well as the intended AC voltage without any modification. Hence, a specialized set of appliances and a majority of common appliances are benefited from the switched mode power supply circuit 200B. For example, a mobile phone benefits because the charger is a switched mode device. This use makes this power supply extremely useful. The characteristics of the system are used as a short period power source as well as the power source for sustained long period. The internal diodes switching produces smooth glitch free operation. Hence, the value to the customer is high. The main element of the power supply is recognition of loads with switched mode power supply.

The first bridge rectifier 204 is primarily used for converting AC voltage to DC voltage. The bridge rectifier 204 internally produces a DC voltage and the DC voltage internally goes forward. During the first half cycle based on the AC input supply voltage 206, the diode 204A and the diode 204B both are forward biased, and the diode 204C and the diode 204D are both reverse biased. Current flows through the path consisting diode 204A and diode 204B and goes till the electrical load 208A. During the second half cycle based on the AC input supply voltage 206, the diode 204B and the diode 204C are both forward biased, and the diode 204A and the diode 204D are both reverse biased. Current flows through the path containing the diode 204B and the diode 204C and goes till the electrical load 208B. If a positive voltage is given between the first diode 102A and the second diode 202B, the electrical load 208A is positive voltage and the electrical load 208B is negative voltage. The same implies even if a negative voltage is given between the first diode 202A and the second diode 202B also.

Figure 4:
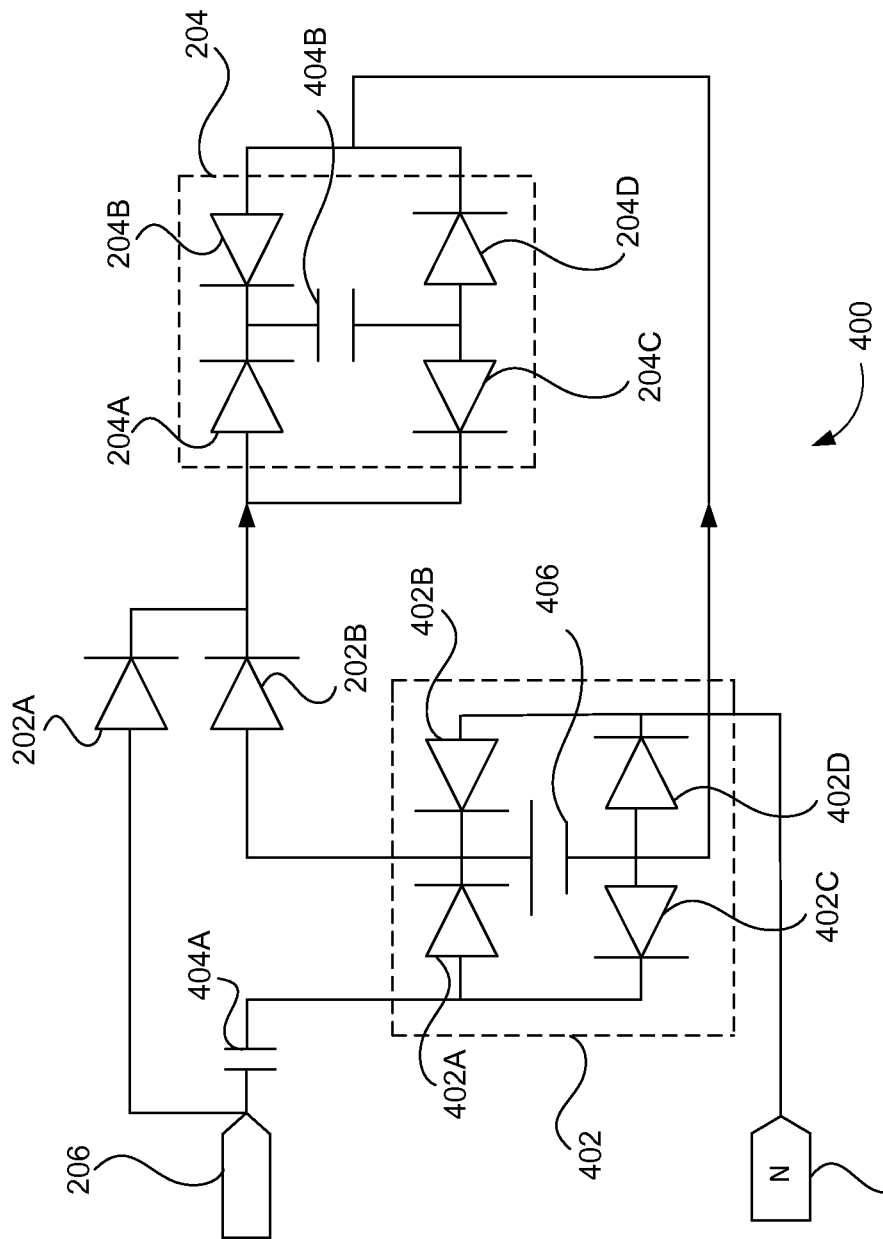
FIG. 4 is a circuit diagram that illustrates the uninterruptible power supply circuit with capacitors to increase a charging efficiency by not dissipating any power and store charge without affecting the circuit operation of FIG. 1 according to an embodiment herein.

FIG. 4 is a circuit diagram 400 that illustrates the uninterruptible power supply circuit with capacitors to increase a charging efficiency by not dissipating any power and store charge without affecting the circuit operation of FIG. 1 according to an embodiment herein. The circuit diagram 400 includes a second bridge rectifier 402, one or more capacitors 404A-B, and a 120V battery 406. The second bridge rectifier 402 includes a third pair of diodes 402A-B, and a fourth pair of diodes 402C-D. The first bridge rectifier 204, and the bridge rectifier 402 are being a part of the loads. The positive terminal of the diode 402A and the negative terminal of the diode 402C are connected to the negative terminal of the second diode 402B. The negative terminals of the third pair of diodes 402A-B are connected to one another and the positive terminals of the fourth pair of diodes 402C-D are connected to one another. The first capacitor 404A that includes a positive terminal and a negative terminal. The positive terminal of the first capacitor 404A is connected to the AC input supply voltage 206, and the negative terminal of the first capacitor 404A is connected to the positive terminal of the diode 204A and the negative terminal of the diode 204C. The 120V battery 406 that includes a positive terminal and a negative terminal. The positive terminal of the 120V battery 406 is connected to the positive terminal of the second diode 202B and a negative terminal of the 120V battery 406 is connected to the positive terminal of the diode 402B and the negative terminal of the diode 402D. The second capacitor 404B that includes a positive terminal and a negative terminal. The positive terminal of the second capacitor 404B is connected to the negative terminals of the third pair of diodes 402A-B and the negative terminal of the second capacitor 404C is connected to the positive terminals of the fourth pair of diodes 402C-D. The primary use of capacitors in UPS is for proper fluctuation in voltage levels. The bridge rectifier can accept either AC voltage or DC voltage as an input. The primary advantage of this circuit is that an inverter is not required for AC to DC conversion since the bridge rectifier performs this function.

Firstly, a DC voltage of 230V is generated at the input. This DC voltage is then fed to the bridge rectifier and a DC voltage is gotten again with no glitches. When AC turns off, the load connects to the DC and the requirement there is 120V. The AC produces one half of the sinusoidal and 120V DC is connected to the junction point. Therefore, when the AC is on, it's powers the bridge rectifiers and capacitors as soon as the AC is turned off. Then DC easily takes over without a glitch. The main drawbacks overcome here are that the inverter is completely eliminated and the battery charging circuit is further simplified. Also, a 120V battery is used which is more efficient when compared to a 12V battery.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An uninterruptible power supply circuit, comprising:
   a first diode that comprises a positive terminal and a negative terminal, wherein said positive terminal of said first diode is connected to an AC input supply voltage;
   a second diode that comprises a positive terminal and a negative terminal, wherein said positive terminal of said second diode is connected to a positive terminal of a battery source, and said negative terminal of said second diode is connected to said negative terminal of said first diode;
   a bridge rectifier that comprises a first pair of diodes and a second pair of diodes, wherein a negative terminal of a first diode of said first pair of diodes is connected to a positive terminal of a second diode of said first pair of diodes, wherein said negative terminal of a second diode of said second pair of diodes is connected to a positive terminal of a first diode of said second pair of diodes, a negative terminal of said battery source, and a ground terminal, wherein said negative terminals of said first diode, and said second diode are connected to said positive terminal of said second diode of said first pair of diodes and said negative terminal of said first diode of said first pair of diodes; and
   a plurality of electrical loads are connected to said negative terminals of said second diode of said first pair of diodes and said first diode of said second pair of diodes, and said positive terminals of said first diode of said first pair of diodes and said second diode of said second pair of diodes respectively to drive said plurality of electrical loads with a DC voltage or said intended AC supply voltage when said AC supply voltage is cutoff.

2. The uninterruptable power supply circuit of claim 1, further comprises a 200 W AC bulb acting like a current limiting resistor that is connected between said negative terminal of said first diode and said positive terminal of said second diode to charge the battery connected with said uninterrupted power supply device when the battery voltage is lower than said AC input supply voltage.

3. An uninterrupted power supply circuit, comprising:
   a first diode that comprises a positive terminal and a negative terminal, wherein said positive terminal of said first diode is connected to an AC input supply voltage;
   a second diode that comprises a positive terminal and a negative terminal, wherein said positive terminal of said second diode is connected to a positive terminal of a battery source, and said negative terminal of said second diode is connected to the negative terminal of said first diode;
   a 200 W AC bulb is connected between said positive terminal of said second diode and said negative terminal of said first diode to charge the battery that is connected with the uninterrupted power supply circuit when the battery voltage is lower than said AC input supply voltage;
   a bridge rectifier that comprises a first pair of diodes and a second pair diodes, wherein a negative terminal of a first diode of said first pair of diodes is connected to a positive terminal of a second diode of said first pair of diodes, wherein said negative terminal of a second diode of said second pair of diodes is connected to a positive terminal of a first diode of said second pair of diodes, a negative terminal of said battery source, and a ground terminal, wherein said negative terminals of said first diode, and said second diode are connected to said positive terminal of said second diode of said first pair of diodes and said negative terminal of said first diode of said first pair of diodes, wherein a load uses a DC that is produced by said bridge rectifier; and a plurality of electrical loads are connected to said negative terminals of said second diode of said first pair of diodes and said first diode of said second pair of diodes, and said positive terminals of said first diode of said first pair of diodes and said second diode of said second pair of diodes respectively to drive said plurality of electrical loads with a DC voltage or said intended AC supply voltage when said AC supply voltage is cutoff.

4. The uninterrupted power supply circuit of claim 3, wherein said plurality of electrical loads are functioned when said AC input supply voltage and an output DC voltage difference are low.

5. The uninterrupted power supply circuit of claim 3, wherein said 200 W AC bulb is connected between said negative terminal of said first diode and said positive terminal of said second diode as a charging circuit that is added to said switched mode power supply circuit.

6. The uninterrupted power supply circuit of claim 3, wherein said plurality of electrical loads of the uninterrupted power supply circuit are handled high voltage input range (110V-220V) using said switched mode power supply circuit.

7. An uninterrupted power supply circuit, comprising:

a first diode that comprises a positive terminal and a negative terminal, wherein said positive terminal of said first diode is connected to an AC input supply voltage;

a second diode that comprises a positive terminal and a negative terminal, wherein said negative terminal of said second diode is connected to said negative terminal of first diode;

a first bridge rectifier that comprises a first pair of diodes, and a second pair of diodes, wherein negative terminals of said first pair of diodes are connected to one another, wherein said positive terminal of a second diode of said first pair of diodes and said negative terminal of a second diode of said second pair of diodes are connected to a ground terminal;

a second bridge rectifier that comprises a third pair of diodes, and a fourth pair of diodes, wherein said negative terminals of third pair of diodes are connected to one another and connected to said positive terminal of said second diode, wherein said positive terminals of said fourth pair of diodes are connected to one another;

a first capacitor that comprises a positive terminal and a negative terminal, wherein said positive terminal of said first capacitor is connected to said AC input supply voltage, and said negative terminal of said first capacitor is connected to said positive terminal of said diode and said negative terminal of said a first diode of said third pair of diodes;

a second capacitor that comprises a positive terminal and a negative terminal, wherein said positive terminal of said second capacitor is connected to said negative terminals of said first pair of diodes and said negative terminal of said second capacitor is connected to said positive terminals of said second pair of diodes; and a 120V battery that comprises a positive terminal and a negative terminal, wherein said positive terminal of said 120 V battery is connected to said positive terminal of said second diode and a negative terminal of said 120V battery is connected to said positive terminal of said second diode of said first pair of diodes and said negative terminal of said second diode of said second pair of diodes to work on dampening the voltage change by eliminating the peaks to maintain the constant voltage level.

\* \* \* \* \*